(12) United States Patent
Marcoux et al.

(10) Patent No.: US 10,904,050 B1
(45) Date of Patent: Jan. 26, 2021

(54) DATA PROCESSING FOR AUTOMATIC MODULATION CLASSIFICATION OF WIRELESS SIGNALS

(71) Applicant: The MITRE Corporation, McLean, VA (US)

(72) Inventors: Caitlyn N. Marcoux, McLean, VA (US); Ballard J. Blair, McLean, VA (US); Bindu Chandna, McLean, VA (US); Dianne E. Egnor, McLean, VA (US)

(73) Assignee: The MITRE Corporation, McLean, VA (US)

( * ) Notice: Subject to any disclaimer, the term of this patent is extended or adjusted under 35 U.S.C. 154(b) by 0 days.

(21) Appl. No.: 16/510,207

(22) Filed: Jul. 12, 2019

(51) Int. Cl.
*H04L 27/00* (2006.01)
*H04L 27/01* (2006.01)
(Continued)

(52) U.S. Cl.
CPC ........ *H04L 27/0012* (2013.01); *G06K 9/6276* (2013.01); *G06K 9/6282* (2013.01);
(Continued)

(58) Field of Classification Search
CPC .. H04L 27/0012; H04L 27/0008; H04B 13/02
See application file for complete search history.

(56) References Cited

U.S. PATENT DOCUMENTS 7,428,270 B1 * 9/2008 Dubuc ................ H04L 27/0012
375/224
8,295,341 B2 * 10/2012 Bose ................... H04L 25/0307
375/229

(Continued)

FOREIGN PATENT DOCUMENTS

CN 102299875 12/2011
CN 102546494 7/2012
(Continued)

OTHER PUBLICATIONS

Amari et al. (Oct. 1998). "Adaptive Blind Signal Processing—Neural Network Approaches," Proceedings of the IEEE 86(10): 2026-2048.

(Continued)

*Primary Examiner* — David S Huang
(74) *Attorney, Agent, or Firm* — Morrison & Foerster LLP

(57) ABSTRACT

Systems and methods for classifying a modulation scheme of a wireless signal are described. In some embodiments, a system receives a wireless signal modulated based on a modulation scheme having a constant modulus. The system can generate a resampled signal from the wireless signal based on features extracted from the wireless signal and perform blind equalization on the resampled signal based on a constant modulus criterion to generate an equalized signal. Then, the system can cause a modulation classifier to classify the received wireless signal to a modulation scheme from a plurality of predetermined modulation schemes based on the equalized signal. By preconditioning the wireless signal to reduce feature variability imparted by a propagation channel onto the wireless signal, the system can increase the classification accuracy of the modulation classifier.

20 Claims, 6 Drawing Sheets

(51) Int. Cl.
*H04L 27/20* (2006.01)
*G06N 3/08* (2006.01)
*G06K 9/62* (2006.01)
*H04L 27/148* (2006.01)

(52) U.S. Cl.
CPC ............. *G06N 3/08* (2013.01); *H04L 27/148* (2013.01); *H04L 27/2014* (2013.01)

(56) References Cited

U.S. PATENT DOCUMENTS

| | | | |
|---|---|---|---|
| 9,869,752 | B1 | 1/2018 | Premus et al. |
| 2006/0072679 | A1* | 4/2006 | Chen .................. H04B 1/0003 375/261 |
| 2017/0052269 | A1 | 2/2017 | Cotton et al. |
| 2018/0083731 | A1 | 3/2018 | Ochi et al. |

FOREIGN PATENT DOCUMENTS

| | | |
|---|---|---|
| CN | 105898760 | 8/2016 |
| CN | 106682574 | 5/2017 |
| CN | 107864020 | 3/2018 |

OTHER PUBLICATIONS

Shen et al. (Apr. 2018). "Compression of a Deep Competitive Network Based on Mutual Information for Underwater Acoustic Targets Recognition," Entropy 20(243): 13 pages.

\* cited by examiner

DATA PROCESSING FOR AUTOMATIC MODULATION CLASSIFICATION OF WIRELESS SIGNALS

FIELD OF THE DISCLOSURE

The present disclosure relates generally to systems and methods for classifying a modulation scheme of wireless signals and in particular, processing the wireless signals to improve the accuracy of automatic modulation classifiers.

BACKGROUND OF THE DISCLOSURE

Modulation classifiers can classify wireless signals to a modulation scheme used to embed data within the wireless signals. For example, a modulation classifier may identify that a particular wireless signal embeds data using frequency shift keying (FSK), which is an example modulation scheme. An automatic modulation classifier can automatically identify the modulation scheme of a received wireless signal based on characteristics of the received signal. The automatic modulation classifier may allow for a universal receiver capable of processing wireless signals according to a plurality of modulation schemes instead of requiring the use of multiple receivers each capable of processing a specific type of modulation scheme.

Wireless signals transmitted from a transmitter to a receiver undergo various effects caused by the propagation channel. The propagation channel may significantly alter characteristics of the wireless signals and introduce greater variability in signal characteristics. For example, wireless signals undergo a propagation phenomenon known as multipath in which the wireless signal reaches the antenna by two or more paths. Multipath is caused by reflections and refractions from objects or different medium densities between the transmitter and the receiver. Multipath may be especially prominent in underwater acoustic communication in which an underwater acoustic signal can be reflected by the water surface and the bottom surface as well as be reflected from various objects in the water. The multipath phenomenon significantly reduces the classification accuracy of current modulation classifiers, especially for classifying underwater acoustic communication signals.

One reason for lower classification accuracy is because of the increased variability in characteristics of wireless signals caused by difficult propagation channels, as is the case in undersea environments. To raise the classification accuracy, current modulation classifiers need to be trained with a large amount of training data to represent the propagation channel. Due to the highly variable conditions of many propagation channels, however, collecting a large enough data sample to accurately represent the propagation channel is infeasible and cost prohibitive. For example, underwater propagation channels can have very different characteristics depending on time variations such as day vs night, the time of day, time of year, season, or El Nino and La Nina events, etc. Moreover, due to the limited and more realistic amount of training datasets that can be obtained, these modulation classifiers are more likely to be overfitted—leading to less accurate classification results.

SUMMARY OF THE DISCLOSURE

As discussed above, current modulation classifiers have reduced accuracy in classifying modulation schemes of a wireless signal in highly-variable, complex channels. Accordingly, there is a need for systems, methods, and computer program embodiments to improve the classification accuracies of automatic modulation classifiers.

In some embodiments, a method for classifying wireless signals includes receiving a wireless signal modulated based on a modulation scheme having a constant modulus. A resampled signal can be generated from the wireless signal based on features extracted from the wireless signal. Blind equalization can be performed on the resampled signal based on a constant modulus criterion to generate an equalized signal. Then, a modulation classifier can be caused to classify the received wireless signal to a modulation scheme from a plurality of predetermined modulation schemes based on the equalized signal. In some embodiments, by performing blind equalization on wireless signals, data complexity and variability can be reduced for the modulation classifiers. As a result, less training data is needed to train modulation classifiers and classification accuracy can be increased.

In some embodiments of the method, the features comprise an estimated center frequency and an estimated bandwidth of the wireless signal. In some embodiments, the features comprise an oversampling rate.

In some embodiments of the method, generating the resampled signal comprises: filtering the wireless signal to determine the estimated center frequency and the estimated bandwidth of the wireless signal; and resampling the wireless signal based on the estimated center frequency and the estimated bandwidth to generate the resampled signal.

In some embodiments of the method, causing the modulation classifier to classify the received wireless signal comprises: configuring the modulation classifier to classify the equalized signal to classify the received wireless signal to the modulation scheme from the plurality of predetermined modulation schemes.

In some embodiments of the method, causing the modulation classifier to classify the received wireless signal comprises: outputting the equalized signal to the modulation classifier.

In some embodiments of the method, the plurality of modulation schemes are constant-modulus modulation schemes. In some embodiments of the method, the plurality of modulation schemes comprises one or more modulation types including frequency modulation (FM), phase modulation (PM), frequency-shift keying (FSK), phase-shift keying (PSK), or minimum-shift keying (MSK).

In some embodiments of the method, the wireless signal comprises an underwater acoustic signal.

In some embodiments of the method, the modulation classifier comprises a supervised classifier. In some embodiments, the supervised classifier comprises a decision trees classifier, a k-nearest neighbors (k-NN) classifier, a neural networks classifier, a linear classifier, or a margin classifier.

In some embodiments, a system for classifying a modulation scheme of a wireless signal comprises: a receiver configured to receive a wireless signal; a signal preprocessor configured to generate a resampled signal from the wireless signal based on features extracted from the wireless signal; a blind equalizer configured to: perform blind equalization on the resampled signal based on a constant modulus criterion to generate an equalized signal, and cause a modulation classifier to classify the received wireless signal to a modulation scheme from a plurality of predetermined modulation schemes based on the equalized signal.

In some embodiments of the system, the features comprise an estimated center frequency and an estimated bandwidth of the wireless signal. In some embodiments, the features comprise an oversampling rate.

In some embodiments of the system, to generate the resampled signal, the signal preprocessor is configured to: filter the wireless signal to determine the estimated center frequency and the estimated bandwidth of the wireless signal; and resample the wireless signal based on the estimated center frequency and the estimated bandwidth to generate the resampled signal.

In some embodiments of the system, to cause the modulation classifier to classify the received wireless signal, the blind equalizer is configured to: configure the modulation classifier to classify the equalized signal to classify the received wireless signal to the modulation scheme from the plurality of predetermined modulation schemes.

In some embodiments of the system, to cause the modulation classifier to classify the received wireless signal, the blind equalizer is configured to: output the equalized signal to the modulation classifier.

In some embodiments of the system, the plurality of modulation schemes are constant-modulus modulation schemes. In some embodiments, the plurality of modulation schemes comprises one or more modulation types including frequency modulation (FM), phase modulation (PM), frequency-shift keying (FSK), phase-shift keying (PSK), minimum-shift keying (MSK).

In some embodiments of the system, the wireless signal comprises an underwater acoustic signal.

In some embodiments of the system, the modulation classifier comprises a supervised classifier. In some embodiments, the supervised classifier comprises a decision trees classifier, a k-nearest neighbors (k-NN) classifier, a neural networks classifier, a linear classifier, or a margin classifier.

BRIEF DESCRIPTION OF THE DRAWINGS

The foregoing summary, as well as the following detailed description of embodiments, is better understood when read in conjunction with the appended drawings. For the purpose of illustrating the present disclosure, the drawings show example embodiments of the disclosure; the disclosure, however, is not limited to the specific methods and instrumentalities disclosed. In the drawings.

DETAILED DESCRIPTION

Described herein are systems and methods for improving performance of modulation classifiers in classifying a wireless signal to a modulation scheme from a plurality of predetermined modulation schemes. The wireless signal may include data embedded according to a constant-modulus modulation scheme. As described above, many propagation channels can impose highly-variable effects on the wireless signal. These effects include multipath propagation, Doppler spread, etc. that reduce classification accuracy of current modulation classifiers.

In some embodiments, to increase classification accuracy, the wireless signal received by a receiver system can be preconditioned to reduce feature variability imparted by the propagation onto the wireless signal. In some embodiments, the wireless signal can be preconditioned by performing blind equalization on the wireless signal according to the constant modulus criterion to generate an equalized signal. Then, the receiver system can configure the modulation classifier to classify the wireless signal to a modulation scheme from a plurality of predetermined modulation schemes based on the equalized signal. As will be further described below with respect to FIG. 5, simulation results show that preconditioning the received wireless signal improves classification accuracy from 49% to 73% across signal-to-noise ratios (SNRs) ranging from 4-30 dB in 2 dB increments.

Figure 1:
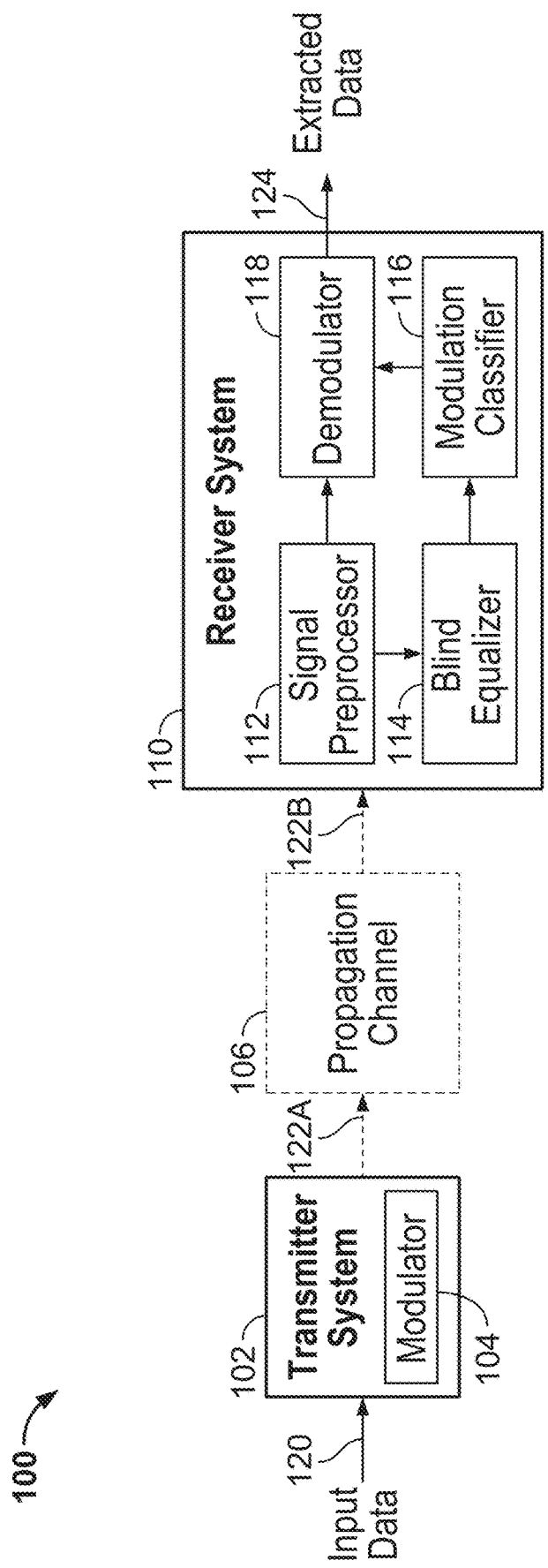
FIG. 1 illustrates a system for classifying a modulation scheme of a wireless signal, according to some embodiments.

FIG. 1 illustrates a system 100 for classifying a modulation scheme of a wireless signal 122A-B, according to some embodiments. In some embodiments, system 100 includes a transmitter system 102 that transmits wireless signal 122A through a propagation channel 106 to receiver system 110. Receiver system 110 receives wireless signal 122A as wireless signal 122B, which corresponds to wireless signal 122A being distorted by propagation channel 106.

In some embodiments, transmitter system 102 includes modulator 104 that is configured to modulate input data 120 according to a constant-modulus modulation scheme. As will be described herein, the terms "constant envelope" and "constant modulus" may be used interchangeably. Example constant modulus modulation schemes may include phase shift keying (PSK) modulation schemes such as binary phase shift keying (BPSK) or quadrature phase shift keying (QPSK), frequency shift keying (FSK) modulation schemes such as Gaussian frequency shift keying (GFSK), or continuous phase modulation (CPM) schemes such as minimum shift keying (MSK) or Gaussian minimum shift keying (GMSK).

In some embodiments, transmitter system 102 can transmit the modulated input data 120 as wireless signal 122A. Wireless signal 122A may be transmitted as a constant modulus signal because the modulation scheme of wireless signal 122A is a constant modulus modulation scheme. A skilled person in the relevant arts would understand that transmitter system 102 would include additional circuitry or hardware to transmit wireless signal 122A. For example, transmitter system 102 may include an antenna to transmit radio signals. In another example, transmitter system 102 may include acoustic transducers (such as a microphone, a hydrophone, an ultrasound transducer, etc.) to transmit acoustic signals such as underwater acoustic signals.

Propagation channel 106 represents a non-guided (i.e., wireless) transmission medium capable of propagating energy waves between transmitter system 102 and receiver system 110. Example energy waves may include acoustic waves or radio waves. In some embodiments, propagation channel 106 can include one or more of a terrestrial wave channel, a space wave channel, a sky wave channel, an outer space channel, an underwater channel, etc. As described above, propagation channel 106 may impose highly variable effects on and distort a wireless signal 122A. This distortion caused by propagation channel 106 can significantly reduce accuracy of traditional modulation classifiers. These variations are caused by many factors including, for example, signal loss, noise, shadowing, and multipath propagation. Multipath can induce delay spread due to signals arriving at various time as well as Doppler spread caused by multipath interaction with a moving surface such as the air-water boundary. Delay spread and Doppler spread causes inter-symbol interference (ISI), which distorts signals transmitted in propagation channel 106. For example, underwater acoustic signals are significantly impacted by multipath propagation and delay spread caused by boundary interactions within a fluid propagation channel (e.g., boundary interactions with the bottom/ground and the surface). Additionally, refraction within the fluid propagation channel (e.g., ocean, sea, lake, etc.) caused by sound speed gradients contributes to distortion of signals travelling in this channel.

In some embodiments, receiver system 110 receives wireless signal 122A as wireless signal 122B. Wireless signal 122B can represent wireless signal 122A travelling through propagation channel 106. In some embodiments, to extract data 124 from wireless signal 122B, receiver system 110 can include the following components: a signal preprocessor 112, a blind equalizer 114, a modulation classifier 116, and a demodulator 118. In some embodiments, extracted data 124 generated by receiver system 110 corresponds to input data 120 modulated by transmitter system 102. A skilled person in the relevant arts would understand that receiver system 110 would include additional circuitry or hardware to receive or process wireless signal 122B. For example, receiver system 110 may include an antenna to receive radio signals. In another example, receiver system 110 may include an acoustic receiver to receive acoustic signals. For example, such an acoustic receiver may be a microphone or a hydrophone for receiving acoustic signals in the air and underwater, respectively.

In some embodiments, wireless signal 122A complies with the constant modulus property. In some embodiments, wireless signal 122A can correspond to a radio-frequency (RF) signal received by an antenna. In some embodiments, wireless signal 122A can correspond to an acoustic signal such as an underwater acoustic signal. As explained above, underwater acoustic signals commonly undergo a volatile channel, e.g., through the ocean, when being transmitted by a transmitter to a receiver. Therefore, current modulation classifiers are more likely to be inaccurate at correctly classifying the modulation scheme of the underwater acoustic signal. Two common classification approaches that are currently used for modulation classifiers are: a decision-theoretic (DT) approach and a neural network (NN) approach. Both types of modulation classifiers can achieve improved classification accuracies using receiver system 110, as described below.

In some embodiments, signal preprocessor 112 can be configured to receive wireless signal 122B. In some embodiments, signal preprocessor 112 can be configured to extract features from wireless signal 122B to enable blind equalizer 114 to precondition wireless signal 122B. For example, example features may include estimated signal parameters such as carrier frequency (also referred to as center frequency), signal bandwidth, symbol rate, signal power, oversampling factor (which is a function of the symbol rate), or a combination thereof. In some embodiments, signal preprocessor 112 can be configured to extract the carrier frequency, the signal bandwidth, and the symbol rate. In some embodiments, signal preprocessor 112 can be configured to generate a resampled signal based on wireless signal 122B and the extracted features (e.g., based on an estimated symbol rate or oversampling factor). Then, signal preprocessor 112 can output the resampled signal to blind equalizer 114.

In some embodiments, blind equalizer 114 can be configured to precondition the resampled signal according to the constant modulus criterion to generate an equalized signal. Then, blind equalizer 114 may output the equalized signal to modulation classifier 116. Blind equalizer 114 can be particularly suited to invert propagation channel 106 because the environment of propagation channel 106 is being characterized without a priori modulation information. Blind equalizer 114 will be further described below with respect to FIG. 2.

In some embodiments, modulation classifier 116 can be configured to receive the equalized signal as an input from blind equalizer 114 and perform automated modulation classification of wireless signal 122B based on the corresponding equalized signal. In some embodiments, modulation classifier 116 can be a supervised learning classifier such as a decision tree classifier, a k-nearest neighbors (k-NN) classifier, a neural network classifier, a linear classifier, or a margin classifier such as support vector machines. For example, modulation classifier 116 may be a convolutional neural network (CNN) classifier among other types of neural network classifiers.

In some embodiments, modulation classifier 116 can be configured to classify the equalized signal to a modulation scheme from a plurality of predetermined constant-modulus modulation schemes. By performing classification on the equalized signal, which mitigates effects imposed by propagation channel 106 on wireless signal 122A, modulation classifier 116 can improve classification modulation accuracy. In some embodiments, modulation classifier 116 can be configured to provide the determined modulation scheme for wireless signal 122B to demodulator 118.

In some embodiments, demodulator 118 can be configured to demodulate wireless signal 122B based on the modulation scheme identified by modulation classifier 116 to generate extracted data 124. If the modulation scheme classified by modulation classifier 116 matches the modulation scheme employed by modulator 104, then extracted data 124 would match input data 120 of transmitter system 102. As shown in FIG. 1, demodulator 118 can be configured to perform its own blind equalization (similar to the functionality performed by blind equalizer 114) based on the resampled signal output from signal preprocessor 112 before classifying the modulation scheme of the resampled signal, according to some embodiments. In other embodiments, demodulator 118 can be configured to receive the equalized signal output from blind equalizer 114 and classify the received equalized signal to classify the modulation scheme of wireless signal 122B.

In some embodiments, one or more components of receiver system 110 can be implemented in hardware, software, or a combination thereof. For example, one or more of signal preprocessor 112, blind equalizer 114, modulation classifier 116, and demodulator 118 can be implemented using a digital signal processor, an application specific integrated circuit (ASIC), a field programmable gate array (FPGA), etc.

Figure 2:
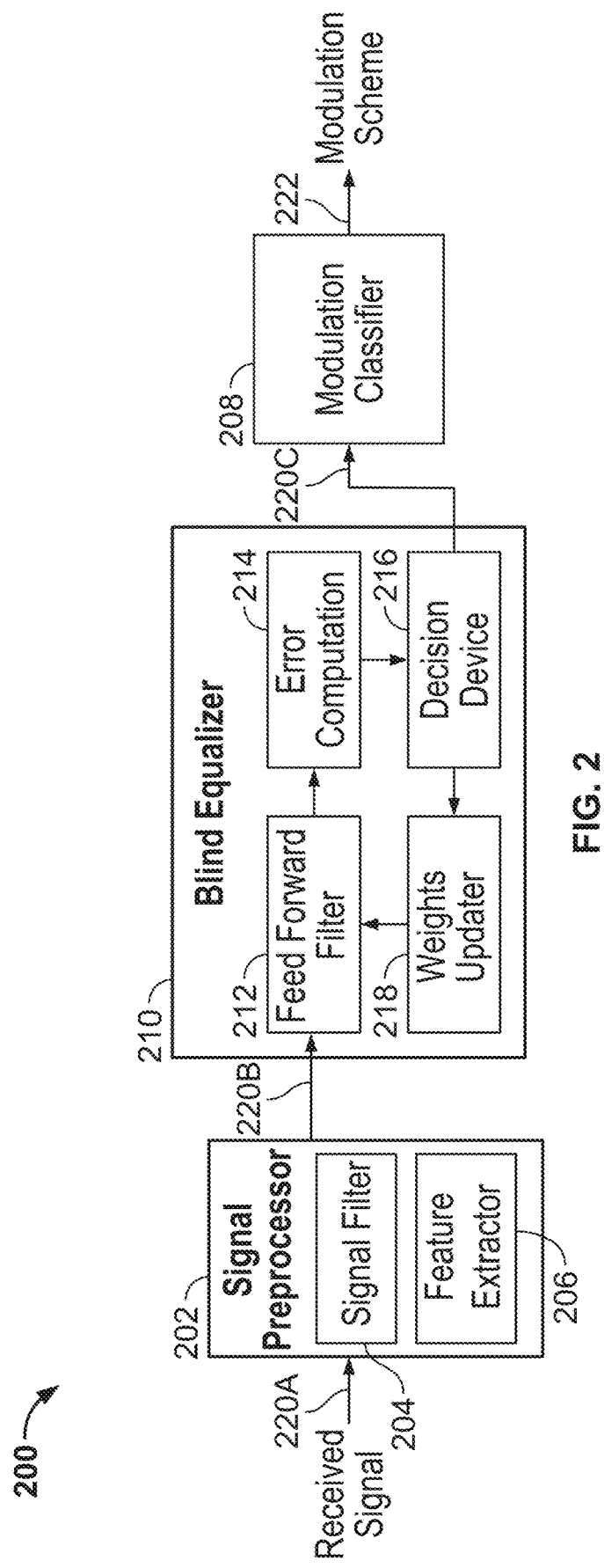
FIG. 2 illustrates a receiver system for classifying a modulation scheme of a wireless signal, according to some embodiments.

FIG. 2 illustrates a receiver system 200 for classifying a modulation scheme of a wireless signal, according to some embodiments. In some embodiments, receiver system 200 can correspond to receiver system 110 as described above with respect to FIG. 1. As shown in FIG. 2, receiver system 200 can include a signal preprocessor 202, a blind equalizer 210, and a modulation classifier 208, each of which correspond to similarly named components of FIG. 1.

In some embodiments, signal preprocessor 202 receives a signal 220A, which corresponds to wireless signal 122B of FIG. 1. In some embodiments, signal preprocessor 202 can include a signal filter 204 and feature extractor 206.

In some embodiments, signal filter 204 can be configured to derive a signal of interest from received signal 220A. In some embodiments, signal filter 204 can be configured to filter signal 220A in space, time, frequency, or a combination thereof to derive the signal of interest.

In some embodiments, signal filter 204 can be configured to perform beamforming or spatial filtering to improve fidelity of receiving wireless signal 122A. In these embodiments, receiver system 200 can include a receiver array, such as an antenna array including multiple antennas, for receiving wireless signal 122B, such as radio signals, at different angles. In other embodiments, receiver system 200 can include a receiver array, such as a sonar array including multiple hydrophones, for receiving wireless signal 122B, such as acoustic signals, at different angles. In both embodiments, signal filter 204 can be configured to filter wireless signal 122B to detect the signal of interest. For example, signal filter 204 may perform subspace tracking algorithms to detect the signal of interest.

In some embodiments, signal filter 204 can be further configured to implement noise mitigation functions such as one or more of impulse rejection, median filtering, or noise shaping to increase fidelity of received signal 220A.

In some embodiments, feature extractor 206 can be configured to extract features of signal 220A based on the signal of interest derived by signal filter 204. In some embodiments, feature extractor 206 can be configured to extract one or more of the following features: an estimate of the carrier frequency, an estimate of signal bandwidth, an estimate of symbol rate, an estimate of signal power, or an estimate oversampling rate.

For example, feature extractor 206 may determine an estimated carrier frequency and an estimated signal bandwidth by generating a power spectrum (also referred to as power spectral density) and employing one or more center frequency estimation algorithms on the generated power spectrum. In some embodiments, feature extractor 206 can estimate the carrier frequency (or center frequency) based on performing one or more of the following analyses: power spectral density, Costas loop, ambiguity function, autoregressive model, subspace tracking, etc. In some embodiments, to estimate the signal bandwidth, feature extractor 206 can perform one or more of the following analyses: power spectral density, Fourier transform and wavelet techniques, candidate signal matched filter banks, etc.

In some embodiments, feature extractor 206 can be configured to determine an estimated symbol rate based on the estimated signal bandwidth. In some embodiments, to estimate the symbol rate, feature extractor 206 can be configured to perform one or more of the following analyses: cyclic power spectrum and other cyclo-stationary techniques, wavelet transform, etc. Based on the estimated symbol rate, feature extractor 206 can be configured to resample the signal of interest at least at twice the rate of the estimated symbol rate. In some embodiments, feature extractor 206 can be configured to resample the signal of interest at a rate of at least five times that of the estimated symbol rate to generate a resampled signal 220B. In some embodiments, by generating and outputting resampled signal 220B to blind equalizer 210, aliasing effects can be reduced and equalizer performance can be improved. In some embodiments, signal preprocessor 202 can be configured to normalize power of outputted resampled signal 220B.

As discussed above with respect to FIG. 1, wireless signal 122A transmitted by transmitter system 102 is transformed by propagation channel 106 before being received by receiver system 110 as wireless signal 122B. This transformation is caused, in part, by multipath propagation that adds inter-symbol interference within wireless signal 122B. As shown in FIG. 2, this distorted wireless signal 122B may be received as received signal 220A. In some embodiments, blind equalizer 210 can be configured to perform blind equalization on the resampled signal 220B according to a constant modulus criterion to undo the effects that propagation channel 106 imparts on wireless signal 122A corresponding to received signal 220A. In contrast to standard equalizers that are trained to equalize known signals or symbols, blind equalizer 210 can be configured to perform blind equalization without any a priori knowledge of characteristics of received signal 220A except that received signal 220A originated from a wireless signal (e.g., wireless signal 122A) modulated according to a constant-modulus modulation scheme, and the parameters estimated by the upstream signal preprocessor 202.

In some embodiments, blind equalizer 210 performs blind equalization on resampled signal 220B to generate an equalized signal 220C outputted to modulation classifier 208. As will be further detailed below with respect to FIG. 5, by constraining the type of modulation schemes to constant-modulus modulation schemes, blind equalizer 210 can be configured to generate equalized signal 220C that significantly improves classification accuracy of modulation classifier 208 for constant-modulus modulation schemes.

In some embodiments, blind equalizer 210 can be configured to iteratively estimate a plurality of equalization weights for a plurality of corresponding equalization taps to model an equalization channel to undo or mitigate the distortion effects of propagation channel 106 of FIG. 1. In some embodiments, during each iteration, blind equalizer 210 can convolve resampled signal 220B with the plurality of equalization taps and compare the convolved signal envelope with that predicted by the constant modulus property to determine whether to adjust the plurality of equalization weights in the next iteration or whether blind equalization is complete. For example, blind equalizer 210 may compare the magnitude of the convolved signal with a value of one, representative of satisfying the constant modulus criterion, and determine that the resampled signal 220B is sufficiently equalized if the difference between the magnitude and one is less than a threshold value. If not, blind equalizer 210 can recalculate estimates of the equalization weights and perform the next blind equalization iteration. In some embodiments, to perform blind equalization, blind equalizer 210 can include the following components: a feedforward filter 212, error computation 214, decision device 216, and weights updater 218.

In some embodiments, feedforward filter 212 receives resampled signal 220B generated by signal preprocessor 202 (i.e., $r_p(k)$). In some embodiments, feedforward filter 212 can be configured to initialize the plurality of equalization weights for the plurality of equalization taps maintained at feedforward filter 212. For example, feedforward filter 212 may initialize a centralized equalization weight to a value of "1" and the remaining equalization weights to "0." In some embodiments, feedforward filter 212 can randomly select a set of samples from resampled signal 220B and convolve the randomly-selected set with the plurality of equalization taps to generate an estimated output signal, y(k). In some embodiments, the estimated output signal can be represented according to the following function: $y(k)=W(i)^H X(k)$, where $W(i)$ represents the $i^{th}$ weighted value of the plurality of equalization taps and $X(k)$ represents the randomly-selected set of samples. In some embodiments, feedforward filter 212 outputs the estimated output signal, y(k), to error computation 214.

In some embodiments, error computation 214 can be configured to compare the estimated output signal envelope against the constant modulus criterion to generate an error value. For example, error computation 214 may calculate a magnitude of the estimated output signal and compare the calculated magnitude with a value of one to generate the error value. In some embodiments, error computation 214 can output the error value to decision device 216.

In some embodiments, decision device 216 can be configured to determine whether an additional iteration of blind equalization needs to be performed based on the error value. For example, decision device 216 may determine that the estimated output signal is sufficiently equalized if the error value is within a threshold value, which may be a predetermined value. If so, decision device 216 may output the estimated output signal as equalized signal 220C. If not, decision device 216 request weights updater 218 to re-estimate and update the plurality of equalization weights for feedforward filter 212.

In some embodiments, weights updater 218 can be configured to recalculate estimates for the plurality of equalization weights for the plurality of corresponding equalization taps at feedforward filter 212. Weights updater 218 may configure the plurality of equalization taps at feedforward filter 212 to use the plurality of calculated equalization weights. In some embodiments, weights updater 218 can be configured to implement an adaptive filter to recalculate the plurality of equalization weights. Examples of such adaptive filters may include the least means squared (LMS) algorithm, the recursive least squares (RLS) algorithm, Kalman filters, or auto-regressive moving-average models, according to some embodiments. For example, for weights updater 218 implementing the LMS algorithm, weights updater 218 can calculate the plurality of equalization weights according to the following function: $W(k+1)=W(k)-\mu\{[|y(k)|^2-1]y(k)*X(k)\}$, where $W(k)$ represents the $k^{th}$ iteration and estimate of equalization weights, y(k) represents the $k^{th}$ estimated output signal, X(k) represents the $k^{th}$ randomly-selected set of samples, and $\mu$ represents a constant value. In some embodiments, the $\mu$ value may be pre-selected to achieve a level of convergence (e.g., within a range of iterations) in weights.

In some embodiments, blind equalizer 210 can be configured to reiterate blind equalization at feedforward filter 212 until decision device 216 determines that an estimated output is sufficiently equalized. In each iteration of blind equalization, feedforward filter 212 can be configured to reiterate the convolution process by randomly selecting another set of samples for resampled signal 220B and convolving the selected set of samples with the equalization taps configured according to the equalization weights recalculated by weights updater 218.

In some embodiments, decision device 216 can be configured to determine whether the error value in each iteration is converging, i.e., the error value is decreasing or approaching 0. If the error value diverges, i.e., the error value is increasing, decision device 216 can be configured to request signal preprocessor 202 to regenerate resampled signal 220B. For example, signal preprocessor 202 may be configured to re-estimate the carrier frequency, re-estimate the signal bandwidth, renormalize the power of received signal 220A, or a combination thereof.

In some embodiments, modulation classifier 208 can be a supervised (or trained) classifier configured to classify equalized signal 220C to a modulation scheme from a plurality of predetermined constant-modulus modulation schemes. Like modulation classifier 116 of FIG. 1, modulation classifier 208 may be any of the current supervised classifiers in use such as a CNN classifier, a linear classifier, a decision trees classifier, a margin classifier (e.g., a large margin classifier), etc. In some embodiments, modulation classifier 208 can classify equalized signal 220C to the modulation scheme and output an indication 222 of the determined modulation scheme.

In some embodiments, by configuring modulation classifier 208 to classify preconditioned, equalized signals, modulation classifier 208 can be more quickly and accurately trained using training data. For example, because the high-variable distortions of propagation channel 106 (as shown and described above with respect to FIG. 1) are mitigated through functions performed by signal preprocessor 202 and blind equalizer 210, modulation classifier 208 may be trained with training data that reflect ideal conditions. In other words, the training data would not need to include various possible types of distortions imposed by propagation channel 106. Therefore, not only can modulation classifier 208 be trained on less training data and be more quickly trained, but also there is reduced risk for overfitting or overtraining modulation classifier 208. As described above with respect to FIGS. 1 and 2, a modulation scheme indicator (e.g., indication 222) can be used by a demodulator (e.g., demodulator 118) to select the appropriate modulation scheme to demodulate wireless signals to extract or decode data (e.g., extracted data 124).

Figure 3:
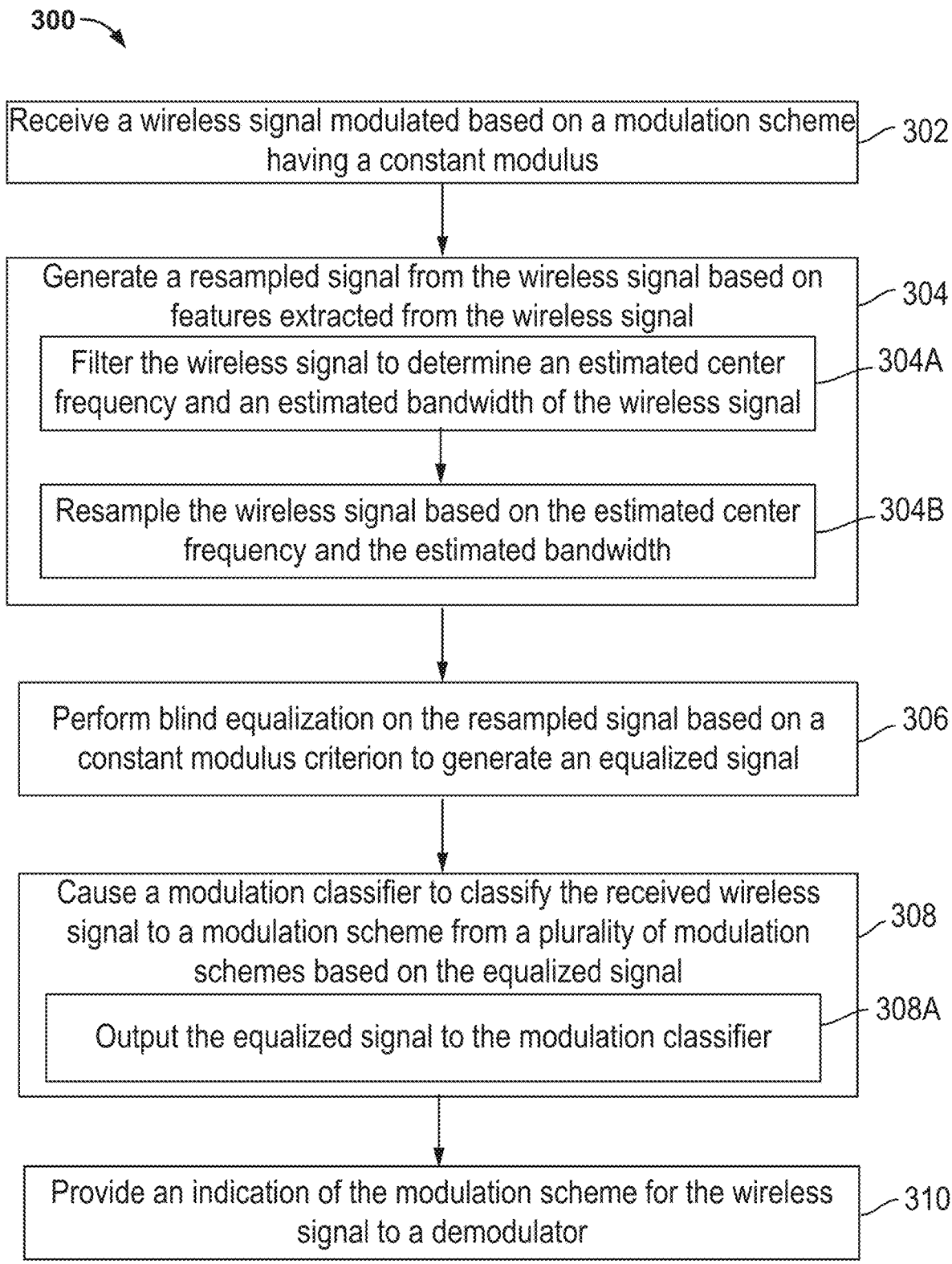
FIG. 3 illustrates a method for classifying a modulation scheme of a wireless signal, according to some embodiments.

FIG. 3 illustrates a method 300 for classifying a modulation scheme of a wireless signal, according to some embodiments. In some embodiments, one or more steps of method 300 can be performed by a receiver system such as receiver system 110 of FIG. 1 or receiver system 200 of FIG. 2.

In step 302, a receiver of the receiver system receives a wireless signal modulated based on a modulation scheme having a constant modulus. In some embodiments, the wireless signal includes data embedded according to the constant-modulus modulation scheme. In some embodiments, the wireless signal can be a radio signal and the receiver may be an antenna. In some embodiments, the wireless signal can be an acoustic signal (e.g., an underwater acoustic signal) and the receiver may be an acoustic receiver.

In step 304, a signal preprocessor of the receiver system generates a resampled signal from the wireless signal based on features extracted from the wireless signal. In some embodiments, the features extracted from the wireless signal may include one or more of an estimated carrier frequency, an estimated bandwidth, or an estimated symbol rate. In some embodiments, step 304 includes steps 304A-B.

In step 304A, the signal preprocessor filters the wireless signal to determine an estimated center frequency and an estimated bandwidth of the wireless signal.

In step 304B, the signal preprocessor resamples the wireless signal based on the estimated center frequency and the estimated bandwidth. In some embodiments, the signal preprocessor can determine an oversampling rate to resample the wireless signal based on the estimated symbol rate.

In step 306, a blind equalizer of the receiver system performs blind equalization on the resampled signal based on a constant-modulus criterion to generate an equalized signal. In some embodiments, the resampled signal is fed two or more times through the blind equalizer to reduce inter-symbol interference (ISI). In some embodiments, the blind equalizer can be a least mean square (LMS) constant modulus algorithm (CMA) blind equalizer. Other types of blind equalizers are described above with respect to FIG. 2.

In step 308, the blind equalizer causes a modulation classifier to classify the received wireless signal to a modulation scheme from a plurality of predetermined modulation schemes based on the equalized signal. In some embodiments, step 308 includes step 308A. In step 308A, the blind equalizer outputs the equalized signal to the modulation classifier to configure the modulation classifier.

In step 310, the modulation classifier provides an indication of the modulation scheme for the wireless signal to a demodulator. As described above with respect to FIG. 2, the functions performed by the blind equalizer can undo some of the distortion imparted on the wireless signal (received in step 302) caused by the propagation channel (e.g., a water channel in the case of underwater acoustic signals). In other words, the blind equalizer can transform the wireless signal received in step 302 into a higher fidelity signal to enable the modulation classifier to be more easily and accurately trained, thereby improving its classification accuracy.

Figure 4:
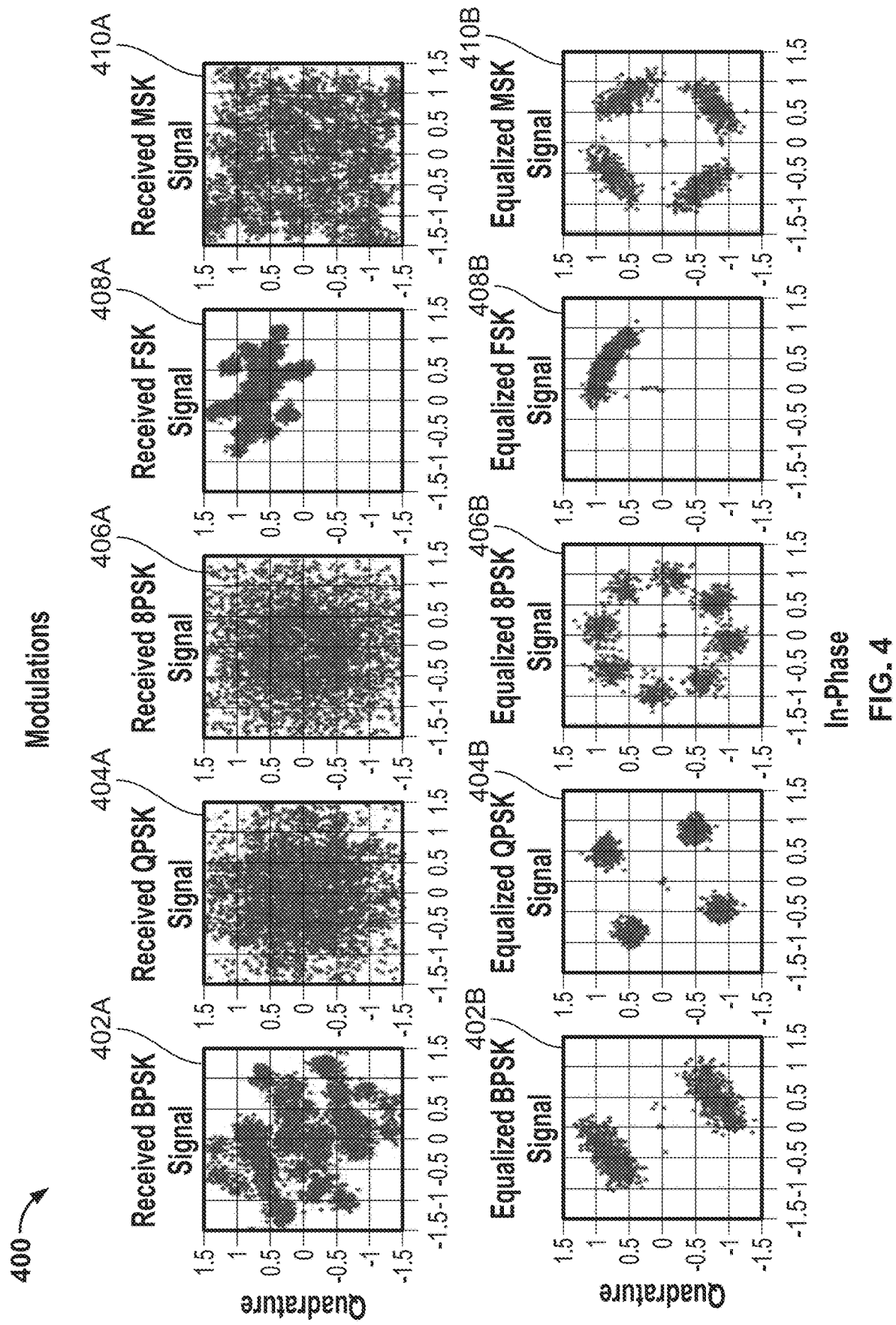
FIG. 4 illustrates charts that show simulated differences between wireless signals received by a receiver system and wireless signals equalized by the receiver system for a plurality of modulation schemes, according to some embodiments.

FIG. 4 illustrates charts 402-410 that show experimentally simulated differences between wireless signals received by a receiver system and wireless signals equalized by the receiver system for a plurality of modulation schemes, according to some embodiments. To generate charts 402-410, blind equalizer 210 of FIG. 2 was modeled in MATLAB® software. In particular, blind equalizer 210 was modeled as a LMS-CMA blind equalizer.

To generate training signals to test performance of blind equalizer 210, multiple ideal communications signals were generated in MATLAB® for five modulation schemes BPSK, QPSK, 8 PSK, FSK, and MSK corresponding to charts 402, 404, 406, 408, and 410, respectively, at various signal to noise ratios (SNRs) ranging from 4-30 dB in increments of 2 dB. The ideal communication signals were generated with known values for the oversampling rate, the signal bandwidth, and the carrier frequency and an Additive White Gaussian noise (AWGN) model was applied to mimic the effect of many random processes that occur in nature. Then, the communication signals were passed through a random, complex channel with a length of 12 taps to generate training signals. The random 12-tap complex channel may simulate the distortion effects of the propagation channel (e.g., ocean medium for underwater acoustic signals) on the ideal communication signals.

Charts 402A, 404A, 406A, 408A, and 410A show constellation diagrams for the received BPSK, QPSK, 8 PSK, FSK, and MSK modulated signals, respectively, passing through the random 12-tap complex channel for an SNR of 20 dB. Charts 402B, 404B, 406B, 408B, and 410B show corresponding constellation diagrams after the BPSK, QPSK, 8 PSK, FSK, and MSK modulated signals are blindly equalized by the MATLAB-modeled blind equalizer.

As shown in FIG. 4, the MATLAB-modeled blind equalizer mitigated the distortion effects caused by the random 12-tap complex channel, which would allow modulation classifiers to more accurately classify and distinguish between communications signals modulated according to different modulation schemes. Though the MATLAB-modeled blind equalizer does not correct for random phase rotations and AWGN effects imposed on the training signals, modulation classifiers can be trained to tolerate such phase ambiguities.

Figure 5:
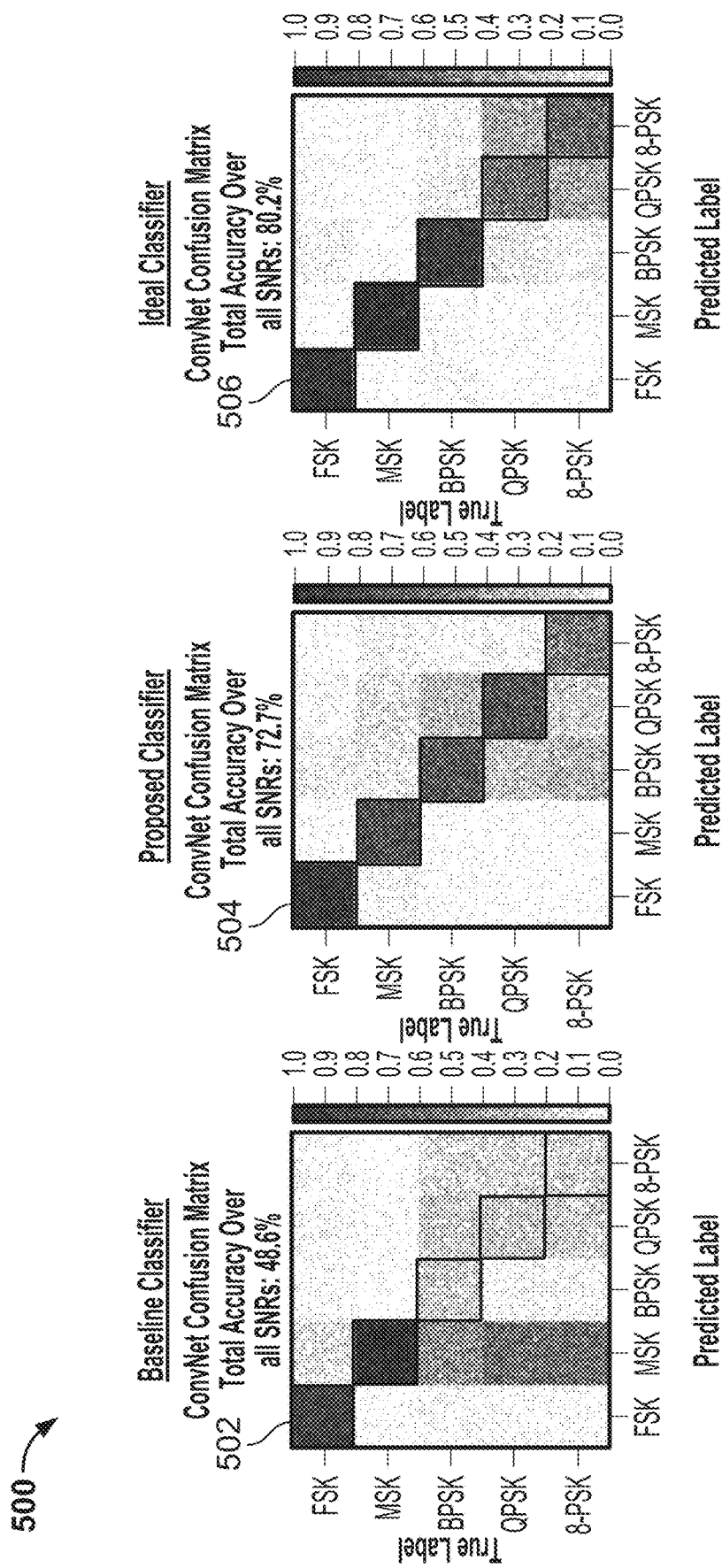
FIG. 5 illustrates confusion matrices showing simulated classification results for a baseline classifier, a proposed classifier, and an ideal classifier, according to some embodiments.

FIG. 5 illustrates confusion matrices showing simulated classification results for a baseline classifier 502, a proposed classifier 504, and an ideal classifier 506, according to some embodiments. Each modulation classifier was implemented in PYTHON software as different instances of the same CNN classifier. In some embodiments, proposed classifier 504 may correspond to modulation classifier 208, as described with respect to FIG. 2, that operates on equalized signals whereas baseline classifier 502 may correspond to a modulation classifier that operates directly on a received, filtered wireless signal (e.g., wireless signal 122B or a signal processed by signal preprocessor 112 of FIG. 1).

As discussed above with respect to FIG. 4, training signals were generated in MATLAB® for five different modulation schemes (BPSK, QPSK, 8 PSK, MSK, and FSK) at varying SNRs ranging from 4-30 dB in increments of 2 dB. Three sets of test data were generated based on the training signals to train baseline classifier 502, proposed classifier 504, and ideal classifier 506, respectively. As shown in the legends of each confusion matrix, a darker shade in a cell representing an intersection between a predicted label and a true label represents a higher accuracy, i.e., the label (i.e., modulation scheme) predicted by the corresponding classifier was the true label (i.e., the actual modulation scheme).

To simulate how an ideal modulation classifier 506 would perform, the CNN classifier was trained on a first set of test data generated by passing an ideal communication signal through random-tap complex channels of 5 different lengths (i.e., lengths of 3, 6, 9, 12, and 15-taps). Then, ideal classifier 506 was tested on test signals generated by passing the same ideal communications signal through the same length complex channels as in training to simulate an ideal scenario where the modulation classifier is trained on all possible propagation channels. However, in practice, it is unrealistic to have enough training data to represent characteristics of all the possible propagation channels and training modulation classifiers on such training data would also be computationally prohibitive. Under this ideal scenario, ideal classifier 506 achieves a total accuracy across all SNRs of 80.2%.

To simulate how baseline classifier 502 would perform, the CNN classifier was trained on received data generated from a random-tap complex channel of one length (i.e., 3 taps), but tested on data generated from random-tap complex channels of four different lengths (i.e., 6, 9, 12, and 15 taps). This scenario simulates a realistic scenario, in which the CNN classifier would be trained on data representative of a subset of channel characteristics of the propagation channel, but may need to classify modulation schemes for wireless signals undergoing highly variable distortion effects. In this realistic scenario, baseline classifier 502 achieved a total accuracy across all SNRs of 48.6%. This accuracy is much worse than the accuracy achieved by the ideal classifier 506.

In contrast to baseline classifier 502, proposed classifier 504 is implemented according to the receiver system 110 and 200 described above with respect to FIGS. 1 and 2, respectively. In particular, received signals are first equalized before the CNN classifier classifies the modulation scheme of the equalized signal. To simulate how proposed classifier 504 would perform, the CNN classifier is trained on ideal communication signals with random phase rotations and AWGN effects and tested on the same test data as for baseline classifier 502. As demonstrated above with respect to FIG. 4, equalizing the received data before classification reduces channel distortion effects that confuse the classifier. Accordingly, proposed classifier 504 achieves a total accuracy across all SNRs of 72.7%, which is a substantial ~24% improvement in modulation classification accuracy as compared to that of baseline classifier 502.

Figure 6:
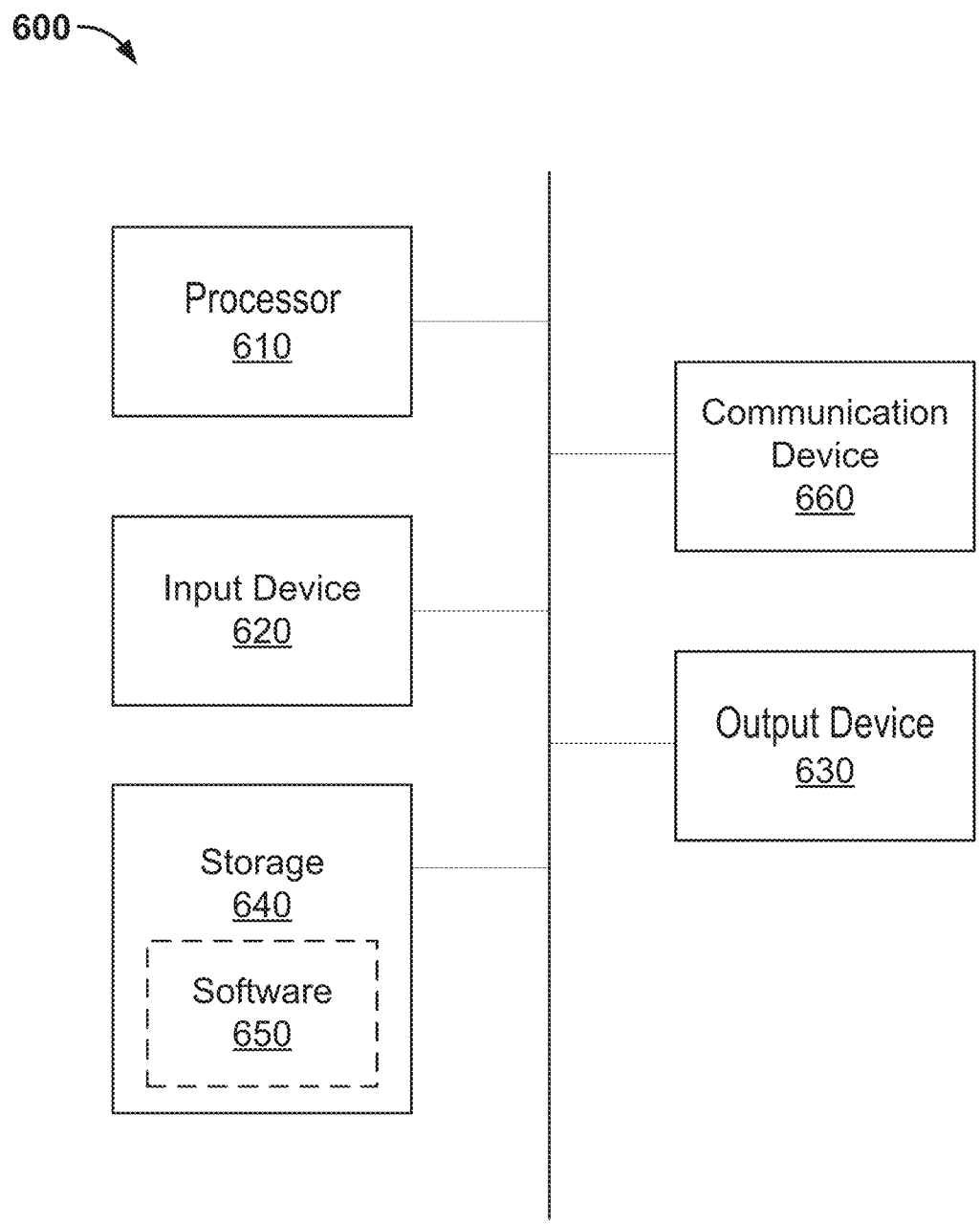
FIG. 6 illustrates an example of a computing device, according to some embodiments.

FIG. 6 illustrates an example of a computing device in accordance with one or more examples of the disclosure. Device 600 can be a host computer connected to a network. Device 600 can be a client computer or a server. As shown in FIG. 6, device 600 can be any suitable type of microprocessor-based device, such as a personal computer, workstation, server, or handheld computing device (portable electronic device), such as a phone or tablet. The device can include, for example, one or more of processor 610, input device 620, output device 630, storage 640, and communication device 660. Input device 620 and output device 630 can generally correspond to those described above, and they can either be connectable or integrated with the computer. In some embodiments, device 600 can be an example of one or more components of FIGS. 1 and 2. For example, device 600 can be configured to implement signal receiver system 110, preprocessor 202, blind equalizer 210, or modulation classifier 208.

Input device 620 can be any suitable device that provides input, such as a touch screen, keyboard or keypad, mouse, or voice-recognition device. Output device 630 can be any suitable device that provides output, such as a touch screen, haptics device, or speaker.

Storage 640 can be any suitable device that provides storage, such as an electrical, magnetic, or optical memory including a RAM, cache, hard drive, or removable storage disk. Communication device 660 can include any suitable device capable of transmitting and receiving signals over a network, such as a network interface chip or device. The components of the computer can be connected in any suitable manner, such as via a physical bus or wirelessly.

Software 650, which can be stored in storage 640 and executed by processor 610, can include, for example, the programming that embodies the functionality of the present disclosure (e.g., as embodied in the devices described above).

Software 650 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 640, that can contain or store programming for use by or in connection with an instruction execution system, apparatus, or device.

Software 650 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 600 can implement any operating system suitable for operating on the network. Software 650 can be written in any suitable programming language, such as C, C++, Java, or Python. In various embodiments, application software embodying the functionality of the present disclosure can be deployed in different configurations, such as in a client/server arrangement or through a web browser as a web-based application or web service, for example.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A method for classifying a modulation scheme of a wireless signal, comprising:
   receiving a wireless signal modulated based on a modulation scheme having a constant modulus;
   generating a resampled signal from the wireless signal based on features extracted from the wireless signal, the features comprising an estimated center frequency and an estimated bandwidth of the wireless signal;
   performing blind equalization on the resampled signal based on a constant modulus criterion to generate an equalized signal; and
   causing a modulation classifier to classify the received wireless signal to a modulation scheme from a plurality of predetermined modulation schemes based on the equalized signal.

2. The method of claim 1, wherein the features comprise an oversampling rate.

3. The method of claim 1, wherein generating the resampled signal comprises:
   filtering the wireless signal to determine the estimated center frequency and the estimated bandwidth of the wireless signal; and
   resampling the wireless signal based on the estimated center frequency and the estimated bandwidth to generate the resampled signal.

4. The method of claim 1, wherein causing the modulation classifier to classify the received wireless signal comprises:
   configuring the modulation classifier to classify the equalized signal to classify the received wireless signal to the modulation scheme from the plurality of predetermined modulation schemes.

5. The method of claim 1, wherein causing the modulation classifier to classify the received wireless signal comprises:
   outputting the equalized signal to the modulation classifier.

6. The method of claim 1, wherein the plurality of modulation schemes are constant-modulus modulation schemes.

7. The method of claim 1, wherein the plurality of modulation schemes comprises one or more modulation types including frequency modulation (FM), phase modulation (PM), frequency-shift keying (FSK), phase-shift keying (PSK), or minimum-shift keying (MSK).

8. The method of claim 1, wherein the wireless signal comprises an underwater acoustic signal.

9. The method of claim 1, wherein the modulation classifier comprises a supervised classifier.

10. The method of claim 9, wherein the supervised classifier comprises a decision trees classifier, a k-nearest neighbors (k-NN) classifier, a neural networks classifier, a linear classifier, or a margin classifier.

11. A system for classifying a modulation scheme of a wireless signal, comprising:
   a receiver configured to receive a wireless signal having a constant modulus;
   a signal preprocessor configured to generate a resampled signal from the wireless signal based on features extracted from the wireless signal, the features comprising an estimated center frequency and an estimated bandwidth of the wireless signal;
   a blind equalizer configured to:
      perform blind equalization on the resampled signal based on a constant modulus criterion to generate an equalized signal; and
      cause a modulation classifier to classify the received wireless signal to a modulation scheme from a plurality of predetermined modulation schemes based on the equalized signal.

12. The system of claim 11, wherein the features comprise an oversampling rate.

13. The system of claim 11, wherein to generate the resampled signal, the signal preprocessor is configured to:
   filter the wireless signal to determine the estimated center frequency and the estimated bandwidth of the wireless signal; and
   resample the wireless signal based on the estimated center frequency and the estimated bandwidth to generate the resampled signal.

14. The system of claim 11, wherein to cause the modulation classifier to classify the received wireless signal, the blind equalizer is configured to:
   configure the modulation classifier to classify the equalized signal to classify the received wireless signal to the modulation scheme from the plurality of predetermined modulation schemes.

15. The system of claim 11, wherein to cause the modulation classifier to classify the received wireless signal, the blind equalizer is configured to:
   output the equalized signal to the modulation classifier.

16. The system of claim 11, wherein the plurality of modulation schemes are constant-modulus modulation schemes.

17. The system of claim 11, wherein the plurality of modulation schemes comprises one or more modulation types including frequency modulation (FM), phase modulation (PM), frequency-shift keying (FSK), phase-shift keying (PSK), minimum-shift keying (MSK).

18. The system of claim 11, wherein the wireless signal comprises an underwater acoustic signal.

19. The system of claim 11, wherein the modulation classifier comprises a supervised classifier.

20. The system of claim 19, wherein the supervised classifier comprises a decision trees classifier, a k-nearest neighbors (k-NN) classifier, a neural networks classifier, a linear classifier, or a margin classifier.

* * * * *